United States Patent
Smithson et al.

(10) Patent No.: US 6,822,190 B2
(45) Date of Patent: Nov. 23, 2004

(54) OPTICAL FIBER OR WAVEGUIDE LENS

(75) Inventors: Robert Leland Wee Smithson, Mahtomedi, MN (US); Jeffrey Bruce Hill, Stillwater, MN (US); Stephen Paul Le Blanc, Austin, TX (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/317,734

(22) Filed: Dec. 12, 2002

(65) Prior Publication Data

US 2004/0112877 A1 Jun. 17, 2004

(51) Int. Cl.$^7$ ............................................ B23K 26/38
(52) U.S. Cl. .................... 219/121.69; 264/400
(58) Field of Search .................. 219/121.69, 121.67, 219/121.68, 121.73, 121.74, 121.75; 65/392, 378, 387; 385/33, 43, 129

(56) References Cited

U.S. PATENT DOCUMENTS

| | | |
|---|---|---|
| 3,811,857 A | 5/1974 | Deeg et al. |
| 3,910,677 A | 10/1975 | Becker et al. |
| 4,380,365 A | 4/1983 | Gross |
| 4,710,605 A | 12/1987 | Presby |
| 4,725,115 A | 2/1988 | Beasley |
| 4,867,776 A | 9/1989 | Sharp |
| 4,932,989 A | 6/1990 | Presby |
| 5,011,254 A | 4/1991 | Edwards et al. |
| 5,054,877 A | 10/1991 | Ortiz, Jr. et al. |
| 5,256,851 A | 10/1993 | Presby |
| 5,446,816 A | 8/1995 | Shiraishi et al. |
| 5,455,879 A | 10/1995 | Modavis et al. |
| 5,457,759 A | 10/1995 | Kalonji et al. |
| 5,463,707 A | 10/1995 | Nakata et al. |
| 5,479,549 A | 12/1995 | Kurata |
| 5,495,541 A | 2/1996 | Murray et al. |

(List continued on next page.)

FOREIGN PATENT DOCUMENTS

| | | |
|---|---|---|
| EP | 0 558 230 B1 | 9/1993 |
| EP | 0 689 072 B1 | 12/1995 |
| EP | 1 046 935 A1 | 10/2000 |
| EP | 1 075 926 B1 | 2/2001 |
| JP | 1-297601 | 11/1989 |
| JP | 7-49432 | 2/1995 |
| JP | 7-159617 | 6/1995 |
| JP | 8-86923 | 4/1996 |
| JP | 8-114729 | 5/1996 |
| JP | 8-254639 | 10/1996 |
| JP | 8-292341 | 11/1996 |
| JP | 9-295355 | 11/1997 |
| JP | 10-78531 | 3/1998 |
| JP | 10-142446 | 5/1998 |
| JP | 10-239538 | 9/1998 |
| JP | 11-218641 | 8/1999 |
| JP | 2000-314831 | 11/2000 |
| JP | 2000-352629 | 12/2000 |
| JP | 2001-56413 | 2/2001 |
| JP | 2001-124932 | 5/2001 |
| JP | 2001-235638 | 8/2001 |
| WO | WO 01/44871 A1 | 6/2001 |
| WO | WO 02/34452 A1 | 5/2002 |

OTHER PUBLICATIONS

Article: Krüger et al., "Laser Micromachining of Barium Aluminium Borosilicate Glass with Pulse Durations Between 20 fs and 3 ps," *Applied Surface Science* 127–129, Elsevier Science, (1998), pp. 892–898.

(List continued on next page.)

*Primary Examiner*—Kiley Stoner
*Assistant Examiner*—Jonathan Johnson
(74) *Attorney, Agent, or Firm*—Sean Edman

(57) ABSTRACT

Method of making a lens on an optical fiber or waveguide using a femtosecond laser. The lens may be further smoothed by the application of heat.

19 Claims, 4 Drawing Sheets-

U.S. PATENT DOCUMENTS

| | | |
|---|---|---|
| 5,500,911 A | 3/1996 | Roff |
| 5,563,969 A | 10/1996 | Honmou |
| 5,566,262 A | 10/1996 | Yamane et al. |
| 5,620,495 A | 4/1997 | Aspell et al. |
| 5,656,186 A | 8/1997 | Mourou et al. |
| 5,657,138 A | 8/1997 | Lewis et al. |
| 5,699,464 A | 12/1997 | Marcuse et al. |
| 5,701,373 A | 12/1997 | Oleskevich |
| 5,742,026 A | 4/1998 | Dickinson et al. |
| 5,751,871 A | 5/1998 | Krivoshlykov et al. |
| 5,845,024 A | 12/1998 | Tsushima et al. |
| 5,940,557 A | 8/1999 | Harker |
| 5,946,140 A | 8/1999 | Huang |
| 5,982,962 A | 11/1999 | Koops et al. |
| 6,125,225 A | 9/2000 | Dianov et al. |
| 6,130,972 A | 10/2000 | Shiraishi et al. |
| 6,137,938 A | 10/2000 | Korn et al. |
| 6,238,100 B1 * | 5/2001 | Sasaki et al. ............. 385/59 |
| 6,246,026 B1 | 6/2001 | Vergeest |
| 6,285,002 B1 * | 9/2001 | Ngoi et al. ............ 219/121.73 |
| 6,287,020 B1 | 9/2001 | Osaka et al. |
| 6,304,688 B1 | 10/2001 | Korn et al. |
| 6,317,550 B2 | 11/2001 | Irie et al. |
| 6,332,053 B1 | 12/2001 | Irie et al. |
| 6,413,450 B1 | 7/2002 | Mays, Jr. |
| 6,415,087 B1 | 7/2002 | Yang et al. |
| 2001/0012425 A1 | 8/2001 | Irie et al. |
| 2001/0045108 A1 * | 11/2001 | Steinberg et al. ............ 65/378 |
| 2002/0031300 A1 | 3/2002 | Jie et al. |
| 2002/0162360 A1 * | 11/2002 | Schaffer et al. ............ 65/392 |

OTHER PUBLICATIONS

Article: Herman et al., "Laser Shaping of Photonic Materials: Deep–Ultraviolet and Ultrafast Lasers," *Applied Surface Science* 154–155, Elsevier Science, (2000), pp. 577–586.

Fedotov et al., "Laser Micromachining of Microstructure Fibers with Femtosecond Pulses," *Laser Physics*, vol. 13, No. 4, pp. 657–663, 2003.

H.M. Presby, et al., "Laser Micromachining of Efficient Fiber Microlenses," *Applied Optics*, Optical Societyof America, vol. 29, No. 18, pp. 2692–2695, Jun. 20, 1990.

Varel et al., "Micromachining of Quartz with Ultrashort Laser Pulses," *Applied Physics A Materials Science & Processing*, vol. 65, No. 4/5, pp. 367–373, 1997.

Database Inspection, XP–002275912, Fedotov et al., "Laser Micromachining of Microstructure Fibers with Femtosecond Pulses," Jul. 5, 2002.

* cited by examiner

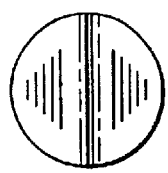
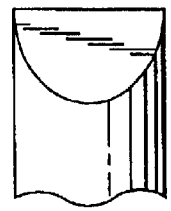
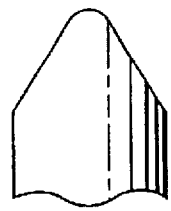
*Fig. 2a*  *Fig. 2b*  *Fig. 2c*
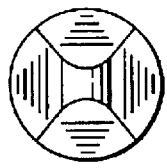
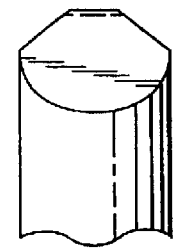
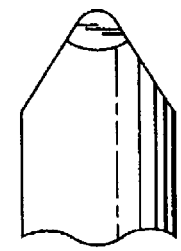
*Fig. 3a*  *Fig. 3b*  *Fig. 3c*
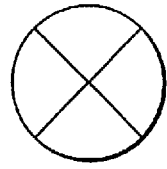
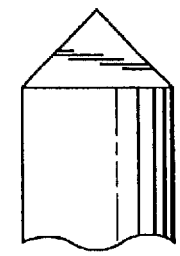
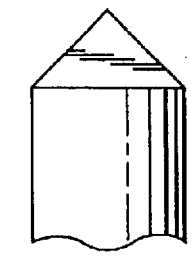
*Fig. 4a*  *Fig. 4b*  *Fig. 4c*
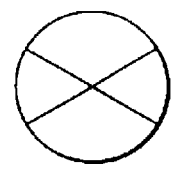
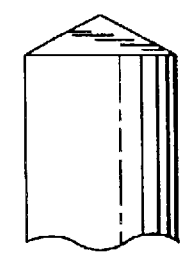
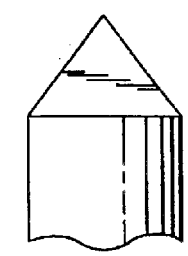
*Fig. 5a*  *Fig. 5b*  *Fig. 5c*

OPTICAL FIBER OR WAVEGUIDE LENS

TECHNICAL FIELD

This disclosure relates to methods of making optical fiber or waveguide lenses.

BACKGROUND

Optical fibers and waveguides made of glass are often used in optical transmission systems and other optical systems. The machining of the end face of these fibers and waveguides plays a crucial role during the use of these single mode or multimode fibers and waveguides. It is important that the end faces have a particularly uniform surface so that the transition from one element of an optical system to another can be carried out with minimal damping values. It is also important that the end faces of the fibers and waveguides can be produced at predetermined angles and that these angles are reliable and reproducible.

The use of lenses to efficiently couple light into or out of a fiber or waveguide from a source is well known. In determining light coupling efficiency between the source and fiber or waveguide, the shape of the fiber or waveguide end and the amount of light emitted from that end can provide information about the performance of the lensed fiber or waveguide.

SUMMARY

One aspect of he present invention features a method of making a lens on an optical fiber comprising providing a laser system having a power density of at least $10^{15}$ W/m² and a laser pulse duration of one picosecond or less; and subjecting the end of an optical fiber to the laser to ablate a portion of the optical fiber such that a desired lens shape is obtained.

Another aspect of the present invention features a method of making a lens on an optical waveguide comprising providing a laser system having a power density of at least $10^{15}$ W/m² and a laser pulse duration of one picosecond or less; and subjecting the end of an optical waveguide to the laser to ablate a portion of the waveguide such that a desired lens shape is obtained.

As used in this invention:
  "lens" means a piece of material, usually glass, and usually curved, used for the refraction of light; and
  "waveguide" means a structure that directs the propagation of energy, in the form of a wave, to follow a prescribed path.

An advantage of at least one embodiment of the present invention is the ability to control surface shaping of a fiber or waveguide lens using a laser ablation process with a substantial lack of heating and mechanical stress on the majority of the fiber or waveguide. In comparison to other laser processes that use longer pulse widths, such as excimer lasers, Nd:YAG lasers, and $CO_2$ lasers that have pulse widths of a few nanoseconds and longer, the ultrafast laser processing of the present invention removes material with minimal collateral thermal effects. In making a desired shape, the lack of heating is an advantage over other techniques, such as flame polishing, because it provides the ability to make a desired shape with no reflow.

Another advantage of at least one embodiment of the present invention is that, in contrast to mechanical processes for removing material, a process of the present invention does not apply flexural stress to the end of the fiber or waveguide, which can be an advantage in handling.

Other features and advantages of the invention will be apparent from the following drawings, detailed description, and claims.

BRIEF DESCRIPTION OF DRAWINGS

FIG. 2 depicts three views of the shape of a fiber with a tapered cylindrical single wedge lens that can be achieved by the present invention.

FIG. 3 depicts three views of the shape of a fiber with a tapered truncated single wedge lens that can be achieved by the present invention.

FIG. 4 depicts three views of the shape of a fiber with a tapered symmetric double wedge lens that can be achieved by the present invention.

FIG. 5 depicts three views of the shape of a fiber with a tapered asymmetric double wedge lens that can be achieved by the present invention.

DETAILED DESCRIPTION

Figure 1:
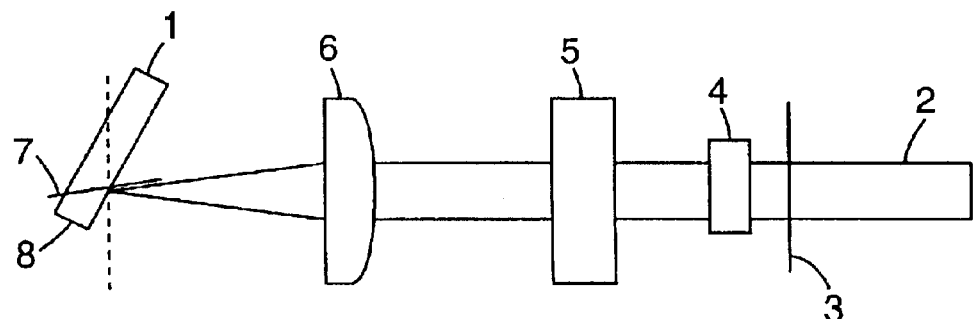
FIG. 1 depicts an exemplary laser system suitable for the invention.

A femtosecond laser delivers short, high-power pulses. The peak power of a pulse is between $10^5$ and $10^{10}$ watts. The pulse lengths are typically up to about 100 femtoseconds (fs). For the present application, a suitable range of pulse lengths is from about 50 to about 150 fs. The power density laser is preferably from about $10^{17}$ to about $10^{18}$ W/m².

Conventional laser machining of materials relies on the intrinsic absorbance of the material at the laser wavelength to transfer energy from the laser beam. As a result, energy is absorbed from the laser over the entire path length of the beam in the material being processed. It is therefore difficult to localize the laser energy in a specific volume in the material.

In the case of machining with a femtosecond laser as in the present invention, the laser wavelength used is typically one at which the intrinsic absorbance of the material is very small. Therefore, virtually no energy is absorbed from the beam at low to moderate laser intensities. However, if the laser intensity is high enough, which is achieved by using a very short laser pulse duration (about 100 fs) and focusing the beam very tightly, the material can interact with the laser beam by a nonlinear mechanism (i.e., 2 or more photons are absorbed simultaneously) and energy is transferred from the laser into the material. Multi-photon absorption is highly efficient below laser pulse durations of 1 picoseconds (ps). The short pulses allow for material removal with minimal melting, which results in precise machining. This nonlinear absorbance only occurs, however, in a small volume around the laser focal point where the intensity is very high. This is in contrast to absorbance along the entire laser path that occurs with intrinsic absorbance. Therefore, a femtosecond laser allows for very precise control of the volume of material removed during the laser machining process. Finally, the 100 fs pulse duration is short enough that any heat generated during the pulse has insufficient time to diffuse from the laser absorption volume. Accordingly, collateral thermal damage is also minimized, further enhancing the precision of the femtosecond laser machining process relative to machining with other lasers. Typically, the laser operates at a wavelength of about 900 nm or less. The fiber or waveguide may be subjected to the laser for one pass or more than one pass. Often, the first cut takes several passes to complete and the second and subsequent cuts are done in one pass.

Per one aspect of the present invention, the shape of the cross-section of the laser beam may range from circular to linear. Preferably the cross-section is circular, more preferably elliptical. An elliptical cross-section may be achieved by using a laser system such as the one depicted in FIG. 1. The shape of the laser beam cross-section may be changed by changing the distance between lenses when two or more lenses are used. For example, an elliptically shaped laser cross-section can be achieved when the focal points of at least two crossed cylindrical lenses do not coincide, but are separated by an appropriate distance. Specifically, the focal point of the first lens occurs before the focal point of the second lens. For another example, a single aspheric lens can be used to make a circularly shaped laser beam cross-section. For yet another example, a reflective objective can be used as the focusing element to create a circular laser beam cross-section. As known by one skilled in the art, the optical elements could be refractive, reflective, or diffractive. One of skill in the art could also determine the appropriate number of optical elements to use and the appropriate separation distances of the optical elements, to focus the laser beam to get the desired power density and intensity profile.

An optical fiber is typically a cylindrical structure comprising a core of relatively high refractive index glass that is at least partially surrounded by a cladding of relatively low refractive index material that transmits a single or multi mode of optical wavelengths.

An optical waveguide is typically an elongated structure that comprises a core of relatively high refractive index glass that is at least partially surrounded by a cladding of relatively low refractive index material, and that is adapted for transmitting therethrough (typically in the longitudinal direction) electromagnetic radiation of optical wavelengths, for example, in the range of 0.4 to 1.7 μm. Waveguide structures include, but are not limited to, multi-mode fibers, planar optical circuits, holey fibers, and photonic bandgap fibers.

Fiber or waveguide lenses may be shaped to have simple or complex configurations. Suitable shapes include single wedge (FIG. 2), truncated wedge (FIG. 3), symmetric double wedge (FIG. 4), and asymmetric double wedge (FIG. 5). In general, the purpose of a lens is to match the optical modes of two adjacent components in an optical system. For example, a lens can match a diverging optical source (e.g., a laser light source) to the mode of a fiber through which the laser light will travel.

Figure 6:
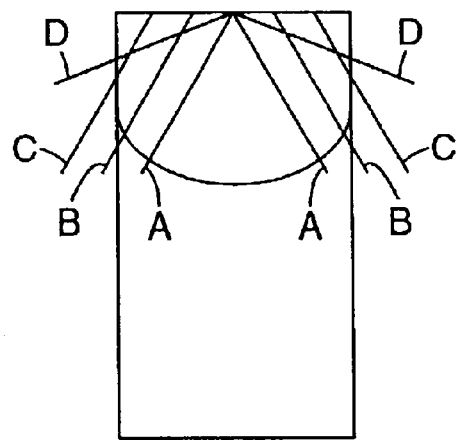
FIG. 6 depicts several cut line angles that can be achieved by the present invention.

Different lens shapes may be achieved by adjusting the angle at which the laser beam intersects the fiber or waveguide. As shown by FIG. 6, the wedge angle may be steep, as with cut line A, or may be shallow as with cut line D. The cuts made may intersect at the tip of the lens as a point, as with cut lines A and D, or may be offset from the center so that the tip has some length, as with cut lines B and C. A wide range of full wedge angles can be produced by changing the cut angle, including, for example, angles of 40 to 120.

An advantage of a lensed optical fiber end is that the ability to efficiently couple light into or out of the fiber is enhanced when compared to a fiber end that has not been lensed. The same advantage applies to a waveguide having a lensed end.

The coupling efficiency of a lensed fiber or waveguide is dependent upon the geometry of the end of the fiber or waveguide. The geometry of the fiber or waveguide end can be described using centration, wedge angle, and radii of the rounded tip of the fiber or waveguide end. Centration is a measure of how well the tip of the lensed fiber or waveguide is centered relative to the optical core of the fiber or waveguide. Wedge angle is the angle from one face of the wedge to the opposing face. The fiber or waveguide end may have more than one radius; that is, it may have two perpendicular radii on the surface of the lensed end.

Figure 7A:
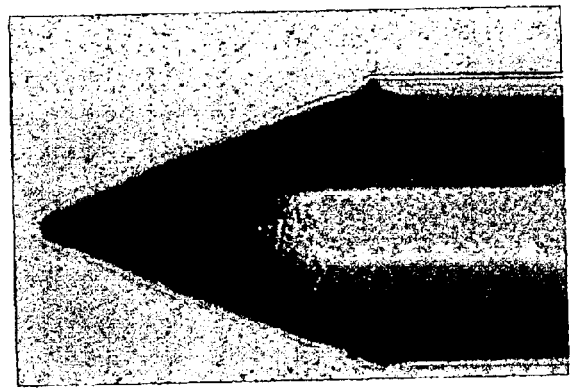
FIGS. 7(a) and 7(b) are digital images of micrographs of a fiber optic lens after laser cutting, but before polishing.
Figure 7B:
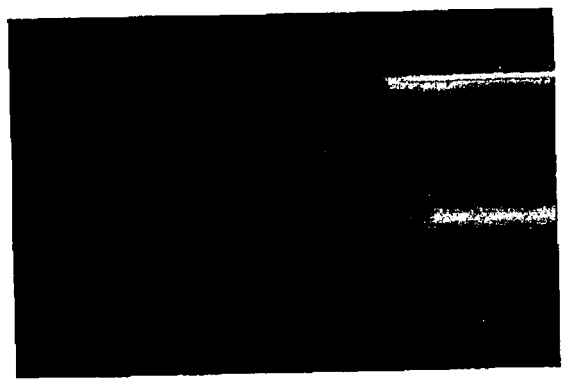
Figure 7C:
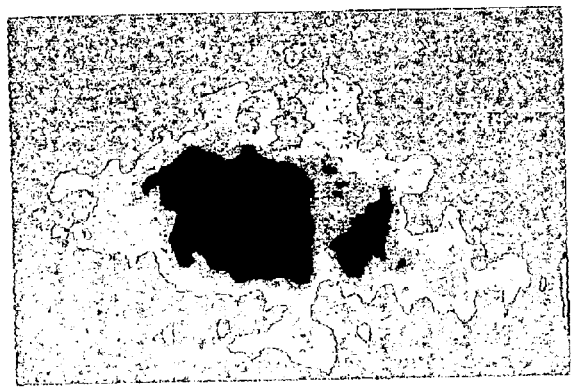
FIG. 7(c) is a digital image of a far-field beam profile wherein the different colors of shading indicate areas of constant intensity.
Figure 8A:
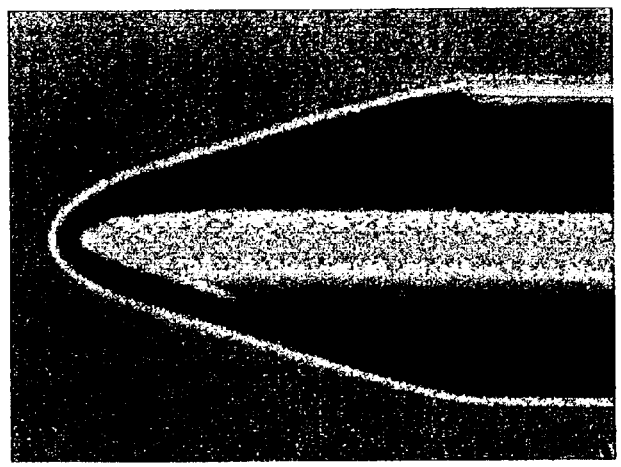
FIGS. 8(a) and 8 (b) are digital images of micrographs of a fiber optic lens after laser cutting and arc polishing.
Figure 8B:
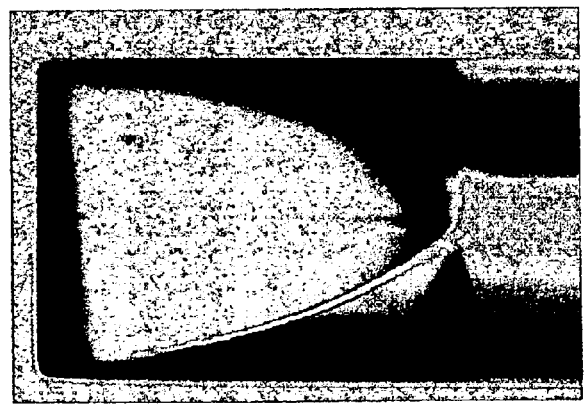
FIG. 8(c) is a digital image of a far-field beam profile wherein the different colors of shading indicate areas of constant intensity.
Figure 8C:
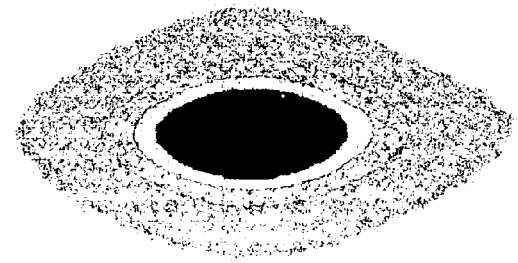

After the fiber or waveguide lens has been cut with a femtosecond laser, it can be subjected to a heat source to achieve smoothing. The heat source may be, for example, an electrical arc, a $CO_2$ laser, or a flame. Subjecting the lens to heat provides a smoother finish to the lens. Preferably the fiber or waveguide has a substantially uniform melt temperature from cladding to core. The smoother finish allows for less scattering and higher transmission of light through the end of the fiber or waveguide. This difference is illustrated by a comparison of FIGS. 7 and 8, which show, respectively, a fiber lens before and after being exposed to a heat source. In particular, FIGS. 7(c) and 8(c) show the improvement in intensity distribution that can be achieved by heat-smoothing the lens. The lens shape can be controlled, to an extent, by adjusting the intensity and duration of the heat application. Naturally, an increase in intensity and/or duration will have a greater effect on the shape of the lens.

EXAMPLES

This invention may be illustrated by way of the following examples.

Test Methods

Fiber lenses were measured for wedge angles, centration, and radii. The wedge angles and centration of the smoothed fiber ends were measured using an optical microscope at magnifications between 40 and 100. The radii were determined using the following far-field laser beam profiling technique. A laser light source (although it could be any suitable light source) was launched into the non-lensed fiber end, emitted through the lensed end and then imaged onto a charge-coupled device camera. The emitted light was collected at 2 different distances/positions from the lens. The shape of the beam intensity profile was used to calculate the radii of the fiber tip using the following equation.

$$R = \frac{(n_2 - n_1) \cdot \omega_o}{\arctan\left(\frac{\omega_2 - \omega_1}{\delta}\right)} \bigg/ \sqrt{1 - \left[\frac{\lambda}{\pi \cdot \omega_o \cdot \arctan\left(\frac{\omega_2 - \omega_1}{\delta}\right)}\right]^2}$$

where R is the radius of the tip, $\omega_1$ and $\omega_2$ are the radii of the waist of the beam profile measured at position 1 and position 2 respectively, $n_1$ is the index of refraction for the light in the fiber, $n_2$ is the index of refraction of air, $\omega_0$ is the mode-field radius of the fiber, $\lambda$ is the wavelength of the light in air, and $\delta$ is the separation between position 1 and 2 along the z-axis of the two beam waist measurements. The radii of the tips for the lensed fiber ends of the invention are shown in Table 1 below.

Examples

Various shaped lenses were produced on the ends of optical fibers using the following technique, which is generally illustrated by FIG. 1. A single mode 980 nanometer optical fiber 1 (1060 Purmode, Corning, Inc. Corning, N.Y.) was set in a grooved holder which was mounted on a servo-motor controlled movable stage (not shown). The fiber was placed such that 5 mm of fiber extended past the edge of the holder. The fiber was passed through the path of a laser beam 2 at a speed of 250 microns/second to cut the end of the fiber. The optical components for the laser process consisted of a laser, a shutter, a neutral density filter wheel, and a pair of crossed, cylindrical lenses. The laser (not shown) was a Hurricane Ti:sapphire 800 nanometer infrared laser (Spectra-Physics, Mountain View, Calif.) having a pulse width of 100 femtoseconds, operating at 1 kHz and having an average power of 1.0 Watt. The shutter 3 was a simple mechanical stop for the laser beam. The average power of the laser at the fiber was controlled by placing an appropriate neutral density filter 4 in the path of the laser beam. The lenses were simple cylindrical lenses 5, 6 suitable for 800 nm output of the laser with focal lengths of 220 mm and 170 mm, respectively. The lenses were oriented perpendicular to each other, and respectively placed 240 mm and 170 mm from the location were the fiber would pass. With this placement of lenses, an elliptical spot shape was made at the location where the fiber would pass. This elliptical spot shape was typically 300 microns by 40 microns for the major and minor axes, respectively, as imaged in a glass slide cover slip at full laser power. The fiber would traverse the laser spot by traveling along the direction of the major axes.

The fiber was positioned at the desired cut angle, and was moved through the laser beam along the major axis of the elliptical spot with more than one pass to make the first cut along cut line 7. Typically, the fiber was passed through the laser beam at average powers of 400, 525, and 700 mW to complete the first cut, thereby removing cut away fiber portion 8.

The fiber was then rotated about its tip to a different cut angle, in a plane containing the fiber axis and the laser beam direction. In this orientation, the fiber was moved through the laser beam at an average power of 700 mW to cut the second cut. For a single wedge, the laser processing steps would be complete. For the truncated wedges and double wedges, the laser processing continued for two more cuts. The fiber was rotated about its axis by 90 degrees, rotated to the appropriate cutting angle and aligned to make the third cut either at the center of the fiber or displaced from the center by the desired amount. The fiber was then moved through the laser beam at an average power of 700 mW. The fiber was rotated about its axis by 180 degrees and aligned to make the fourth cut either at the center of the fiber or displaced from the center by the desired amount. After these steps, the laser processing of the truncated wedges and double wedges was complete.

This process is typical of the examples described below. This description is not meant to limit the number or types of lenses to be used to focus the laser beam, the shape of laser beam, the number of passes, or the possible orientation of the fiber that can be used to make these shapes. Indeed, the only requirement of the average power and spot size is such that exposure of the fiber to that laser beam results in material removal. The execution of passes for each cutting angle can also be changed in order.

Example 1 (Single Wedge)

To produce a wedge shaped lens at the end of an optical fiber as shown in FIG. 2, the fiber was first passed through the elliptical laser spot at a cutting angle of 18 degrees (as measured from the propagation direction of the laser to the optical axis of the fiber) to cut the fiber. The fiber was then rotated 180 degrees and then passed through the spot a second time, producing a wedge shaped end. The shaped fiber optic end was then smoothed via melting by placing the end between two electrodes. An electric arc was created between the two electrodes with a current of 10–13 milliamperes and a duration of 1–3 seconds. An Ericsson FSU 995 fusion splicer (Ericsson Cables AB, Stockholm, Sweden) was used for the smoothing step. The smoothed fiber had a wedge angle of 62 degrees (measured from one face of the wedge to the opposing face), a tip length of 125 microns, a tip radius of 10.6 microns and tip centration relative to the fiber core of 0.1 microns.

Example 2 (Single Wedge)

A wedge shaped lens was produced as in Example 1 except the fiber was cut at a cutting angle of 25 degrees. The smoothed fiber had a wedge angle of 72 degrees (measured from one face of the wedge to the opposing face), a tip length of 125 microns, a tip radius of 11.4 microns and tip centration relative to the fiber core of 0.1 microns.

Example 3 (Truncated Wedge)

To produce a truncated wedge shaped lens at the end of an optical fiber as shown in FIG. 3, the procedure in Example 1 was followed except a cutting angle of 22 degrees was used for the first two cuts. Two additional cuts 180 degrees from each other and 90 degrees from the first two cuts, were made on the fiber end at a cutting angle of 22 degrees. The smoothed fiber had a wedge angle of 63 degrees (measured from one face of the wedge to the opposing face), a tip length of 30 microns, a tip radius of 12.8 microns and tip centration relative to the fiber core of 0.1 microns.

Example 4 (Symmetric Double Wedge)

To produce a double wedge (pyramidal) shaped lens at the end of an optical fiber as shown in FIG. 4, the procedure in Example 1 was followed except a cutting angle of 22 degrees was used for the first two cuts. Two additional cuts, 180 degrees from each other and 90 degrees from the first two cuts, were made on the fiber end at a cutting angle of 22 degrees. The cuts were positioned such that the two pairs of faces were symmetric to each other and the tip of the fiber ended in a point. The smoothed fiber had a double convex shaped tip having a first radius of 14.3 microns and a second radius, measured orthogonally to the first, of 13.9 microns, a wedge angle of 63 degrees (measured from one face of the wedge to the opposing face), and a tip centration relative to the fiber core of 1.4 microns.

Example 5 (Asymmetric Double Wedge)

To produce a double wedge (pyramidal) shaped lens at the end of an optical fiber as shown in FIG. 5, the procedure in Example 4 was followed except a cutting angle of 52 degrees was used for the second two cuts resulting in an asymmetric fiber end. The cuts were positioned such that the tip of the fiber ended in a point. The smoothed fiber had a double convex shaped tip having a first radius of 13 microns and a second radius, measured orthogonally to the first, of 16.1 microns, a wedge angle of 63 degrees for the first pair of wedge faces, a wedge angle of 138 degrees for the second pair of wedge faces, and a tip centration relative to the fiber core of 0.4 microns.

Various modifications and alterations of this invention will become apparent to those skilled in the art without departing from the scope and spirit of this invention and it should be understood that this invention is not to be unduly limited to the illustrative embodiments set forth herein.

What is claimed is:

1. A method of making a lens on an optical fiber comprising:

providing a laser system having a power density of at least $10^{15}$ W/m$^2$ and a laser pulse duration of one picosecond or less;

subjecting the end of an optical fiber to the laser to ablate a portion of the optical fiber such that a lens pre-shape is obtained; and subjecting the ablated portion of the optical fiber to a heat source to smooth the lens surface into a desire shaped.

2. The method of claim 1, wherein the heat source is selected from the group consisting of an electrical arc, a CO$_2$ laser, and a flame.

3. The method of claim 1 wherein the power density is from about $10^{17}$ to $10^{18}$ W/m$^2$.

4. The method of claim 1 wherein the laser system comprises two lenses with different focal lengths.

5. The method of claim 1 wherein the laser system comprises an aspheric lens.

6. The method of claim 1 wherein the lens shape can be controlled by adjusting the cutting angle of the laser.

7. The method of claim 1, wherein the lens shape can be controlled by adjusting the intensity and duration of the heat application.

8. The method of claim 1 wherein the optical fiber is subjected to the laser for more than one pass.

9. The method of claim 1 wherein the laser operates at a wavelength of about 900 nm or less.

10. A method of making a lens on an optical waveguide comprising:

providing a laser system having a power density of at least $10^{15}$ W/m$^2$ and a laser pulse duration of one picosecond or less;

subjecting the end of an optical waveguide to the laser to ablate a portion of the waveguide such that a lens pre-shape is obtained; and subjecting the ablated portion of the waveguide to a heat source to smooth the lens surface into a desired shape.

11. The method of claim 10, wherein the heat source is selected from the group consisting of an electrical arc, a CO$_2$ laser, and a flame.

12. The method of claim 10 wherein the power density is from about $10^{17}$ to $10^{18}$ W/m$^2$.

13. The method of claim 10 wherein the laser system comprises two lenses with different focal lengths.

14. The method of claim 10 wherein the laser system comprises an aspheric lens.

15. The method of claim 10 wherein the lens shape can be controlled by adjusting the cutting angle of the laser.

16. The method of claim 10, wherein the lens shape can be controlled by adjusting the intensity and duration of the heat application.

17. The method of claim 10 wherein the waveguide is subjected to the laser for more than one pass.

18. The method of claim 10 wherein the laser operates at a wavelength of about 900 nm or less.

19. The method of claim 10 wherein the optical waveguide is a planar optical circuit.

* * * * *